United States Patent [19]

Nakamura et al.

[11] Patent Number: 5,016,237
[45] Date of Patent: May 14, 1991

[54] PRISMS OPTICS STABLE WITH RESPECT TO WAVELENGTH AND TEMPERATURE VARIATIONS AND OPTICAL INFORMATION PROCESSING APPARATUS

[75] Inventors: Shigeru Nakamura, Hachioji; Sadao Takahashi, Nagaoka; Masateru Watanabe, Kanagawa; Akira Arimoto, Musashimurayama, all of Japan

[73] Assignee: Hitachi, Ltd., Tokyo, Japan

[21] Appl. No.: 382,025

[22] Filed: Jul. 19, 1989

Related U.S. Application Data

[63] Continuation of Ser. No. 839,510, Mar. 14, 1986, abandoned.

[30] Foreign Application Priority Data

Mar. 22, 1985 [JP] Japan .................................. 60-55830

[51] Int. Cl.$^5$ ................... G11B 7/08; G11B 7/135
[52] U.S. Cl. ........................... 369/112; 369/100; 350/421
[58] Field of Search .......................... 369/44-45, 369/100, 112; 350/6.4, 286, 421

[56] References Cited

U.S. PATENT DOCUMENTS

| | | | |
|---|---|---|---|
| 2,780,140 | 2/1957 | Luboshez | 350/421 |
| 3,856,380 | 12/1974 | Krishnan | 350/286 X |
| 3,871,750 | 3/1975 | Mecklenborg | 350/286 |
| 3,969,573 | 7/1976 | Bouwhuis et al. | 369/112 X |
| 3,969,576 | 7/1976 | Boonstra et al. | 369/112 X |
| 3,978,278 | 8/1976 | Bouwhuis et al. | 369/112 X |
| 4,017,160 | 4/1977 | Betensky | 350/421 |
| 4,084,881 | 4/1978 | Hirabayashi et al. | 350/421 X |
| 4,333,173 | 6/1982 | Yonezawa et al. | 369/45 |
| 4,532,619 | 7/1985 | Sugiyama et al. | 369/112 X |
| 4,607,359 | 8/1986 | Matsubayashi et al. | 369/110 X |
| 4,750,819 | 6/1988 | Sugiki | 350/421 |
| 4,770,507 | 9/1988 | Arimoto et al. | 350/421 |

*Primary Examiner*—Steven L. Stephan
*Assistant Examiner*—W. R. Young
*Attorney, Agent, or Firm*—Antonelli, Terry, Stout & Kraus

[57] ABSTRACT

Prism optics for changing the shape of a light beam, including a composite prism consisting of at least two types of prisms made of materials having different variations in the refractive index due to variations of the refractive index due to wavelength variations and to temperature variations, which materials are so chosen that the angle of the light beam exitting from the prism optics remains almost constant, independent of variations in the wavelength of the light beam and temperature, and an optical information processing apparatus using these prism optics.

9 Claims, 3 Drawing Sheets

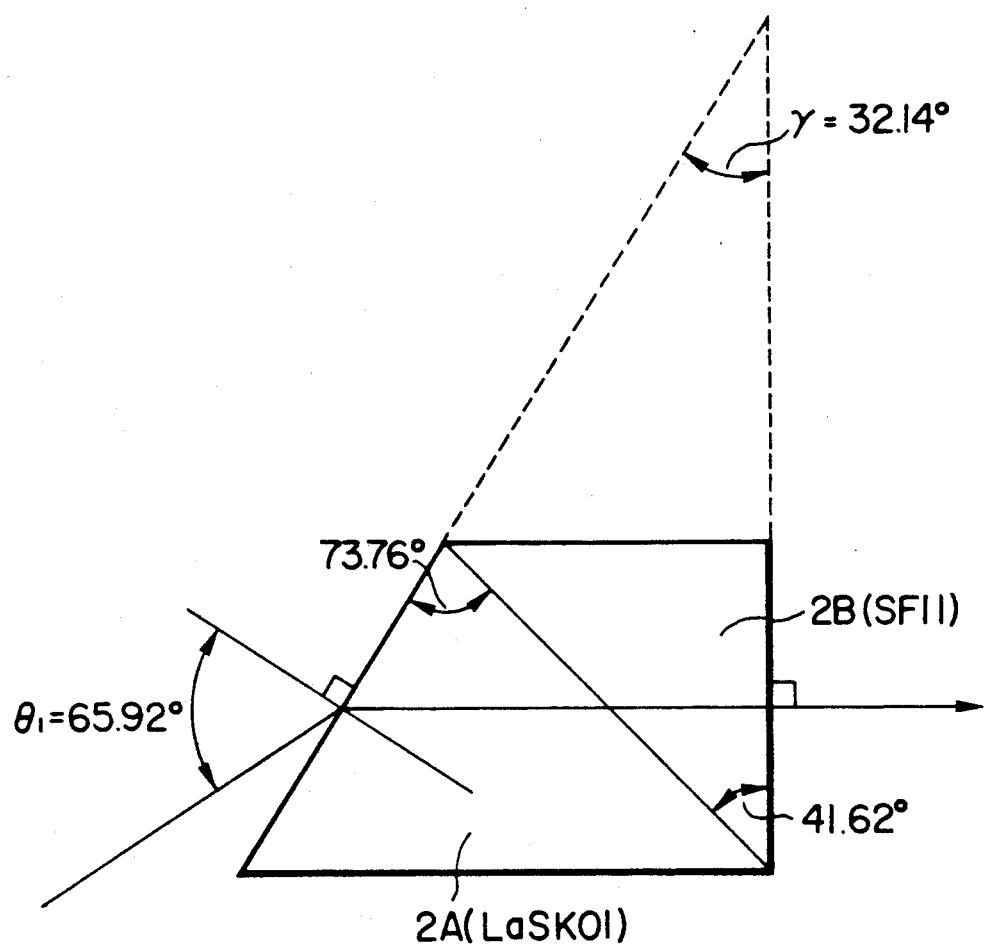

PRISMS OPTICS STABLE WITH RESPECT TO WAVELENGTH AND TEMPERATURE VARIATIONS AND OPTICAL INFORMATION PROCESSING APPARATUS

This application is a continuation of application Ser. No. 839,510, filed Mar. 14, 1986, now abandoned.

CROSS-REFERENCES TO RELATED APPLICATIONS

This application relates to an application U.S. Ser. No. 700,184 entitled "PRISM OPTICS AND OPTICAL INFORMATION PROCESSING APPARATUS", now U.S. Pat. No. 4,770,507.

BACKGROUND OF THE INVENTION

The present invention generally relates to prism optics and an optical information processing system incorporating such prism optics. More particularly, the invention concerns composite prism optics, which are suited for changing the shape of a light beam having a two-dimensional distribution as well as an optical information processing apparatus in which the prism optics are used.

As the optical system for changing the cross-sectional shape of a light beam, there have hithertofore been known two types of optical systems, i.e. an optical system in which a pair of lenses (cylindrical lenses) are disposed at their a focal point, where magnification power of the optical system is adjusted in dependence on the ratio of the focal length of the lenses, and an optical system in which a triangle prism is used and a difference existing between the angle of incidence and the exit angle of the light beam due to refraction of the prism is utilized for changing the shape of the light beam. The present invention concerns an improvement of the last mentioned type of optical systems.

FIG. 1 of the accompanying drawings illustrates refraction of a light beam by a triangle prism 1; in which a light beam is incident on one face of a triangle prism along a direction oblique to the one face. Referring to the figure, when the incident angle (i.e. angle of incidence) and the exit angle at the boundary between air and prism media are represented by $\theta_1$ and $\theta_2$, respectively, the following relation is valid (in accordance with the Snell's law).

$$\sin \theta_1 = n \cdot \sin \theta_2 \quad (101)$$

where n represents the refractive index of the medium constituting the triangle prism.

Further, variations of the diameter of the light beam brought about by the refraction is given by $$D_2/D_1 = \cos \theta_2 / \cos \theta_1, \quad (102)$$

where $D_1$ and $D_2$ represent the diameters of the incident beam and the exit beam, respectively. By making use of the relation mentioned above, change of the beam shape can be realized. On a prism face opposite to the oblique one, the light beam is incident or exits in a direction perpendicular to said other prism face, as will be seen in FIG. 1, so that the ratio of beam diameter generated at the oblique face undergoes no change at said other face. More in detail, refer e.g. to U.S. Pat. No. 4,333,173.

The relations mentioned above are invariable so far as the wavelength of the light beam remains constant. However, when the wavelength varies, the refractive index of the medium constituting the triangle prism undergoes variations, bringing about a corresponding change in the exit angle $\theta_2$ of the light beam, which in turn exerts significant influences on instruments used in combination with the optical system, what is a great disadvantage. The variation in the wavelength of the light beam is ascribable to various causes such as fluctuations of the wavelength of the light emitted by a light source such as, for example, a semiconductor laser device, change in the wavelength of the emitted light in the course of time lapse, change of emission power, change in the ambient temperature and the like. There are two sorts of variations of the refractive index due to temperature variations, i.e. variations of the refractive index brought about by variations in the wavelength due to temperature variations of the semiconductor laser device (wavelength variations) and variations of the refractive index due to temperature variations of the triangle prism it-self.

SUMMARY OF THE INVENTION

In view of the state of the prior art described above, it is an object of the present invention to provide prism optics as well as an optical information processing apparatus incorporating the prism optics, in which the disadvantages and problems of the prior art systems described above are eliminated and the geometric optical properties do not vary independent of variations in the wavelength of the light beam as well as temperature variations.

For accomplishing the above mentioned object, there are proposed according to a general aspect of the present invention prism optics including a composite prism consisting of at least two sorts of prisms made of materials having different variations in the refraction index due to wavelength variations and to temperature variations and an optical information processing apparatus in which the prism optics are used.

BRIEF DESCRIPTION OF THE DRAWINGS

FIG. 5 is a view showing an embodiment of the composite prism according to this invention.

DESCRIPTION OF THE PREFERRED EMBODIMENTS

Figure 1:
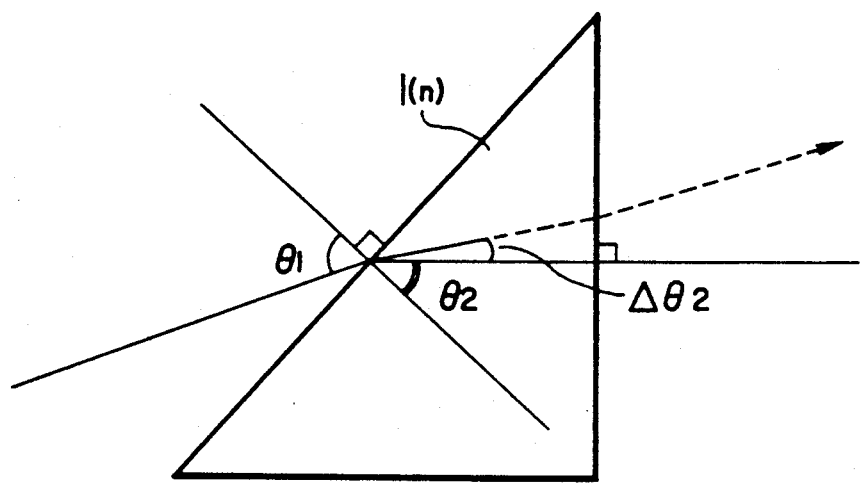
FIG. 1 is a view for illustrating functions of a hithertoknown optical system employing a triangle prism.

Some preferred embodiments of the present invention will be explained below in detail, referring to the drawings, after having explained the principle.

Figure 2:
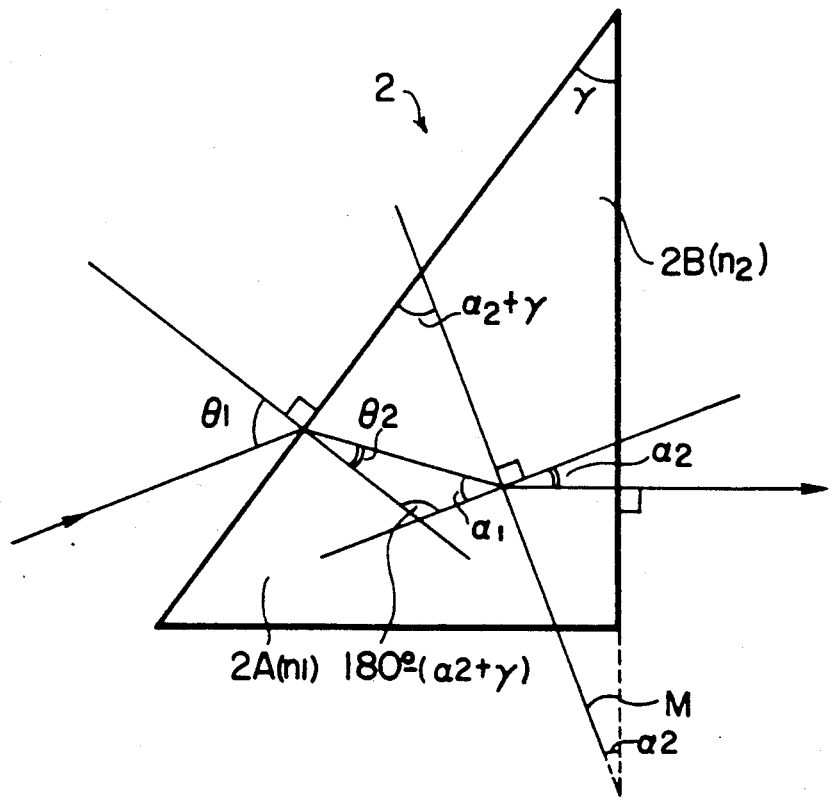
FIG. 2 is a view showing an example of the composite prism according to this invention.

FIG. 2 is a scheme for explaining the principle of this invention, in which the reference numeral 2 indicates a composite prism formed by a first prism 2A made of a first material, whose refractive index is $n_1$, and a second prism 2B made of a second material, whose refractive index is $n_2$, joined together at a surface M.

In the following description, it is assumed that, as already mentioned, a light beam travelling in an air impinges on the composite prism 2 at an angle of incidence $\theta_1$ and leaves the composite prism in the direction perpendicular to the exit face thereof.

At first, a case where the wavelength varies is described. In order that the exit light beam leaves the composite prism in the direction perpendicular to the exit face thereof, arrangement must be made such that the angle indicated by $\alpha_2$ in the figure undergoes no changes regardless of changes in the wavelength of the light beam.

From the Snell's law, the following expressions are valid:

$$\sin\theta_1 = n_1 \sin\theta_2 \quad (1)$$

$$n_1 \sin\alpha_1 = n_2 \sin\alpha_2 \quad (2)$$

and $$\theta_2 + \alpha_1 = C \text{ (constant)} \quad (3)$$

When the changes in the refractive indexes $n_1$, $n_2$, angles $\alpha_1$, $\alpha_2$, $\theta_2$ and others brought about by a change in the wavelength of the incident light beam are represented by $\Delta n_1$, $\Delta n_2$, $\Delta\alpha_1$, $\Delta\alpha_2$, $\Delta\theta_2$ and so forth, respectively (with the assumption that the incident angle $\theta_1$ is constant), the change $\Delta n_1$ is determined from the expression (1) by differentiation as follows:

$$\Delta n_1 = -\frac{n_1}{\tan\theta_2}\Delta\theta_2 \quad (4)$$

Further, from the expression (2), the following expression can be derived by differentiation.

$$\Delta n_1 \sin\alpha_1 + n_1 \cos\alpha_1 \Delta\alpha_1 - \Delta n_2 \sin\alpha_2 = n_2 \cos\alpha_2 \Delta\alpha_2 \quad (5)$$

Since it is necessary that $\Delta\alpha_2 = 0$ for any change in the wavelength, the expression (5) must satisfy the following condition:

$$\Delta n_1 \sin\alpha_1 + n_1 \cos\alpha_1 \Delta\alpha_1 - \Delta n_2 \sin\alpha_2 = 0 \quad (6)$$

Further, differentiation of both sides of the equation (3) results in $$\Delta\theta_2 = -\Delta\alpha_1 \quad (7)$$

Accordingly, from the expressions (2) and (6), $$\sin\alpha_1\left(\Delta n_1 - \Delta n_2 \frac{n_1}{n_2}\right) = -n_1 \cos\alpha_1 \Delta\alpha_1 \quad (8)$$

is derived.

By rearranging equation (8) and combining the result of rearrangement with equation (7), the following relation can be obtained:

$$-\tan\alpha_1\left(\frac{\Delta n_1}{n_1} - \frac{\Delta n_2}{n_2}\right) = \Delta\alpha_1 = -\Delta\theta_2 \quad (9)$$

By eliminating $\Delta\theta_2$ in equation (9), using equation (4), the following equation can be obtained:

$$-\tan\alpha_1\left(\frac{\Delta n_1}{n_1} - \frac{\Delta n_2}{n_2}\right) = \frac{\Delta n_1}{n_1}\tan\theta_2 \quad (10)$$

This expression can be again rewritten as follows:

$$\frac{\Delta n_2}{n_2}\tan\alpha_1 = \frac{\Delta n_1}{n_1}(\tan\theta_2 + \tan\alpha_1) \quad (11)$$

The above expression defines the condition, under which the exit beam angle undergoes no change irrespective of changes in the wavelength of the light beam.

The medium, which has the refractive index and the dispersion of refractivity satisfying the above condition, is available for use for the reason mentioned below.

Assuming, for example, that $\theta_2 = \alpha_1$ and taking it into consideration that $n_1 \approx n_2$, the following relation is valid;

$$2\Delta n_1 \approx n_2.$$

On the basis of data of commercially available glass of optical quality provided by Ohara Optical Glass Manufacturing Co., Ltd., value of $\Delta n_1/\Delta n_2$ can be selected from the range defined below:

$$\frac{1}{6} < \frac{\Delta n_1}{\Delta n_2} < 1.$$

Thus, it is apparent that the optical system which satisfies the condition given by the expression (11) can be implemented for practical purpose.

Now, the case where the temperature of the triangle prism varies will be explained. When $\Delta n_1$ and $\Delta n_2$ in the expression (11) are replaced by variations in the refractive index $\Delta n_{T1}$ and $\Delta n_{T2}$, respectively temperature variations, the expression (11) represents as it is, a condition, under which the exit angle does not vary with temperature variations. Since the expression (11) can be rewritten as follows:

$$\frac{\Delta n_2}{\Delta n_1} = \frac{n_2}{n_1}\cdot\frac{\tan\theta_2 + \tan\alpha_1}{\tan\alpha_1}, \quad (12)$$

the condition as determined by the inventors, under which the exit angle varies neither with wavelength variations of the light beam nor with temperature variations of the triangle prism, can be given by $$\frac{\Delta n_2}{\Delta n_1} = \frac{\Delta n_{T2}}{\Delta n_{T1}} = \frac{n_2}{n_1}\cdot\frac{\tan\theta_2 + \tan\alpha_1}{\tan\alpha_1} \quad (13)$$

That is, in order that the exit angle varies neither with wavelength variations of the light beam nor with temperature variations of the triangle prism, it is necessary to choose materials, for which the ratio between their variations in the refractive index due to the wavelength variations is equal to that between their variations in the refractive index due to the temperature variations.

In this case, in a composite prism 2 constructed as described above, since two prisms 2A and 2B are used, the number of reflecting surfaces is increased and the reflection loss augments. In order to keep this reflection loss as small as possible, it is sufficient to choose two materials constituting the two prisms so that $n_1 = n_2$ at the particular wavelength (central wavelength).

It is obvious that the optical system described above acts in the same manner, when the incident and the exit direction are reversed.

Next, an example, in which this invention is applied to an optical information processing apparatus, will be explained.

Figure 3:
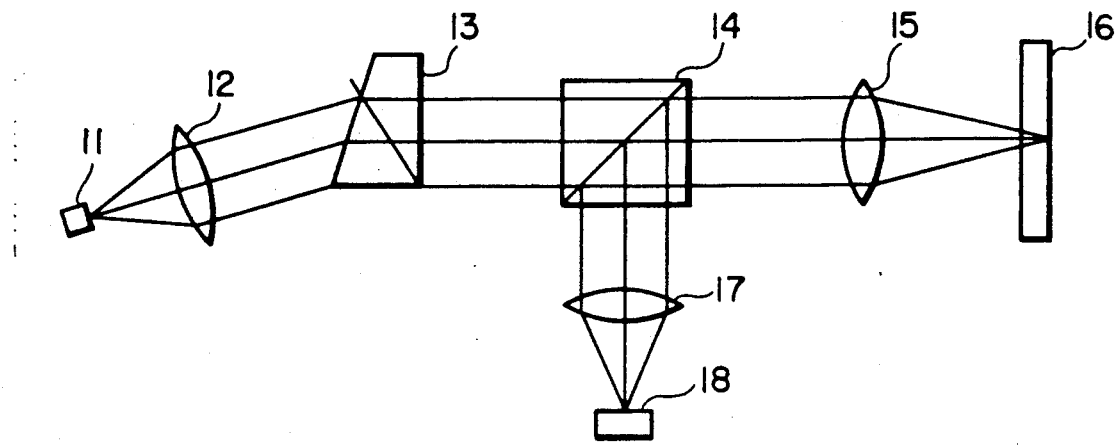
FIGS. 3 and 4 are block diagrams indicating examples of the optical information processing apparatus in which the composite prism is used.

FIG. 3 is a block diagram illustrating a programmable optical disk apparatus, which is an embodiment of the present invention. In the figure, the reference numeral 11 indicates a semiconductor laser device; 12 is a lens; 13 is a composite prism, which is the characteristic part of this embodiment, constructed as indicated in FIG. 2; 14 is a beam splitter; 15 and 17 are lenses; 16 is an optical disk; and 18 is a photodetector.

The working mode of the optical disk apparatus indicated in this embodiment will be explained below.

Laser light emitted by the semiconductor laser device 11 is transformed by the lens 12 into a parallel light beam, which passes through the prism (composite prism) 13 for the purpose of shaping. This prism is characterized in that the angle of the light beam leaving the prism varies neither with wavelength variations of the laser light nor with temperature variations of the prism, as stated previously. After that, the light beam leaving the prism 13 passes through the beam splitter 14 and the lens 15 and is projected on the optical disk 16. Thus information coming from the optical disk 16 is received by the photodetector 18. However, since this work is similar to that for a prior art optical disk apparatus, its explanation in detail will be omitted.

For example, when, between the two prisms constituting the prism 13 (refer to FIG. 5) the first is made of La SK01 fabricated by Ohara Optical Glass Manufacturing Co., Ltd. previously mentioned ($n_1 = 1.74358$ at $\lambda = 830$ nm); the second is made of SF11 fabricated by the same company ($n_2 = 1.76307$ at the same wavelength); $\gamma = 32.14°$; $\alpha_2 = 41.62°$; and $\theta_1 = 65.92°$, $\theta_2 = 31.19°$ and $\alpha_1 = 42.57°$. In this case, the variations in the refractive index $\Delta n_1$ and $\Delta n_2$, when the wavelength changes from 800 nm to 860 nm, are $-0.00185$ and $-0.00313$, respectively. Further, the variations in the refractive index $\Delta n_{T1}$ and $\Delta n_{T2}$, when the temperature changes from 0° C. to 50° C., are 0.000225 and 0.000380, respectively. By using these values, the following relationships can be obtained:

$\Delta n_2/\Delta n_1 = 1.69$, $\Delta n_{T2}/\Delta n_{T1} = 1.69$, and $(n_2/n_1) \times (\tan \theta_2 + \tan \alpha_1)/\tan \alpha_1 = 1.68$, which satisfy the expression (13).

In fact, when the wavelength varies by 10 nm, the exit angle varies by 0.0005° and when the temperature varies by 50° C., it varies by 0.0001°, which are smaller by more than one order of magnitude than the corresponding values obtained by the prior art techniques. In addition, the diameter of the light beam is doubled in the direction, along which it is varied. Consequently, when the incident light is a laser beam, whose ratio of the minor axis to the major one is 1:2, the same ratio for the exit beam is 2:2, i.e. the cross-section of the exit beam is approximately a true circle.

Figure 4:
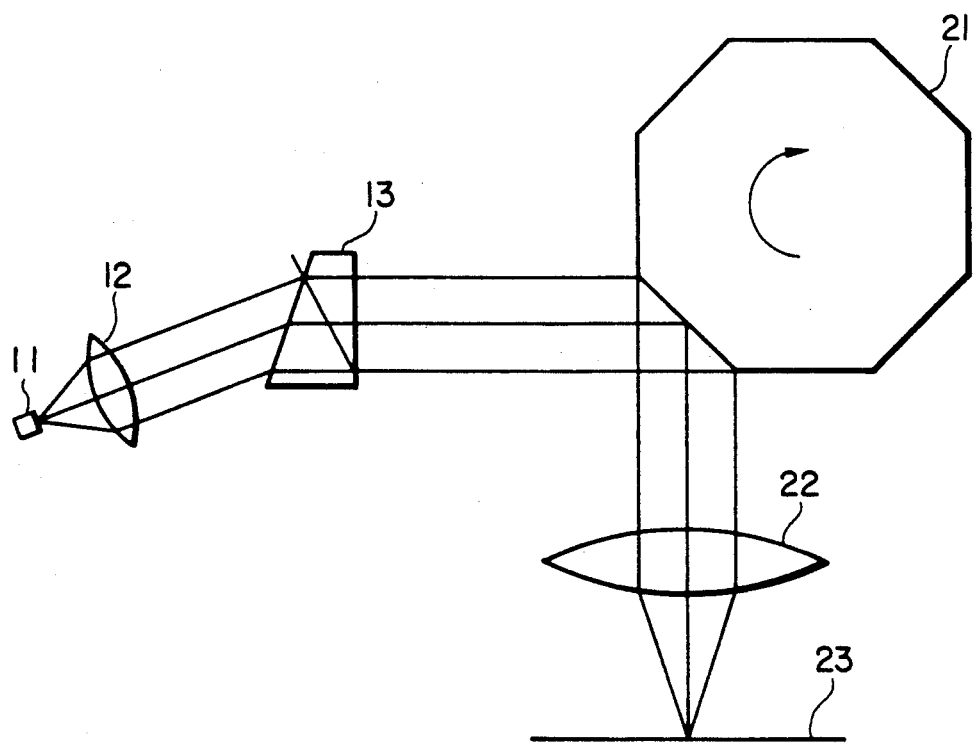

FIG. 4 is a block diagram showing a laser printer, which is another embodiment of this invention. In the figure, the reference numerals 11 to 13 represent components identical to those indicated in FIG. 3; 21 is a polygon mirror; 22 is an F$\theta$ lens; and 23 indicates a photosensitive drum.

In this embodiment, laser light emitted by the semiconductor laser device 11 is transformed by the lens 12 into a parallel light beam, which scans the photosensitive drum 23 through the polygon mirror 21 and the F$\theta$ lens 22 after having passed through the prism 13 for the shaping. In this case, according to the prior art techniques, there was a problem that distortions took place in patterns and characters, which were drawn on the surface of the surface of the photosensitive drum 23, because of variations in the wavelength of the laser light emitted by the semiconductor laser device and temperature variations within the apparatus. This problem is resolved by using the prism 13.

As explained above, according to this invention, since the prism constituting the prism optics is constructed by two sorts of prisms made of materials having different variations in the refraction index due to the dispersion of the refraction index and to temperature variations, a remarkable effect can be obtained that it is possible to realize prism optics, in which the geometric optical properties do not vary, independent of variations in the wavelength of the light beam as well as temperature variations. Furthermore, when such prism optics are applied to an optical information processing apparatus, a remarkable effect can be obtained that it is possible to realize an information apparatus, which is not influenced, even if the wavelength of the light source and the temperature within the apparatus vary significantly.

We claim:

1. Prism optics for changing the shape of a light beam by refraction, including a composite prism consisting of at least two types of prisms made of materials having different variations in refractive index due to wavelength variations and to temperature variations, wherein the ratio of the variations in refractive index due to wavelength variations for the two types of prisms is substantially the same as the ratio of the variations in refractive index due to temperature variations for the two types of prisms.

2. Prism optics according to claim 1, wherein said composite prism of at least two types of prisms consists of a first prism and a second prism.

3. Prism optics according to claim 2, wherein said composite prism is constructed by joining a second surface of said first prism to a first surface of said second prism and when a light beam is projected on said composite prism, it passes successively through the first and the second surface of said first prism and the first and the second surface of said second prism so that it leaves the second surface of said second prism in the direction perpendicular thereto.

4. Prism optics according to claim 2, wherein said composite prism is constructed by joining a second surface of said first prism to a first surface of said second prism, a light beam being projected on a second surface of said second prism in the direction perpendicular thereto, passing successively through a first surface of said second prism, a second and a first surface of said first prism and finally leaving said composite prism at the first surface of said first prism.

5. Prism optics according to claim 3, wherein said composite prism satisfies the conditions represented by:

$$\frac{\Delta n_2}{n_2} \tan \alpha_1 = \frac{\Delta n_1}{n_1} (\tan \theta_2 + \tan \alpha_1) \text{ and}$$

-continued $$\frac{\Delta n_2}{\Delta n_1} = \frac{\Delta n_{T2}}{\Delta n_{T1}},$$

wherein $\Delta n_1$ and $\Delta n_2$ are variations in the refractive index due to wavelength variations; $\Delta n_{T1}$ and $\Delta n_{T2}$ are variations in the refractive index due to temperature variations; $n_1$ and $n_2$ are refractive indexes for a particular wavelength; $\theta_2$ is a refractive angle at the light incidence surface of the first prism; and $\alpha_1$ is the angle of incidence at the boundary surfaces between the first and the second prism.

6. Prism optics according to claim 4, wherein said composite prism satisfies the conditions represented by:

$$\frac{\Delta n_2}{n_2} \tan \alpha_1 = \frac{\Delta n_1}{n_1} (\tan \theta_2 + \tan \alpha_1) \text{ and}$$

$$\frac{\Delta n_2}{\Delta n_1} = \frac{\Delta n_{T2}}{\Delta n_{T1}},$$

where $\Delta n_1$ and $\Delta n_2$ are variations in the refractive index due to wavelength variations; $\Delta n_{T1}$ and $\Delta n_{T2}$ are variations in the refractive index due to temperature variations; $n_1$ and $n_2$ are refractive indexes for a particular wavelength; $\theta_2$ is a refractive angle at the light incidence surface of the first prism; and $\alpha_1$ is the angle of incidence at the boundary surface between the first and the second prism.

7. Prism optics according to claim 4, wherein said two prisms constituting the composite prism are made of materials chosen such that they have a same refractive index $n_1 = n_2$ for a particular wavelength.

8. Prism optics according to claim 6, wherein said two prism constituting the composite prism are made of materials chosen such that they have a same refractive index $n_1 = n_2$ for a particular wavelength.

9. Optical information processing apparatus comprising at least a light source for writing, an optical system transforming a light beam into a parallel light beam, a prism for changing the shape of the parallel light beam and an optical system for converging said parallel light beam, wherein said prism for changing the shape of the parallel light beam is a composite prism consisting of at least two types of prisms including a first prism and a second prism made of material having different variations in the refractive index due to wavelength variations and to temperature variations, said composite prism satisfying the conditions represented by:

$$\frac{\Delta n_2}{n_2} \tan \alpha_1 = \frac{\Delta n_1}{n_1} (\tan \theta_2 + \tan \alpha_1) \text{ and}$$

$$\frac{\Delta n_2}{\Delta n_1} = \frac{\Delta n_{T2}}{\Delta n_{T1}},$$

where $\Delta n_1$ and $\Delta n_2$ are variations in the refractive index due to wavelength variations $\Delta n_{T1}$ and [$\alpha n_{T2}$] $\Delta n_{T2}$ are variations in the refractive index due to temperature variations; $n_1$ and $n_2$ are refractive indexes for a particular wavelength; $\Theta_2$ is a refractive angle at the light incidence surface of the first prism; and $\alpha_1$ is the angle of incidence at the boundary surface between the first and second prism.

* * * * *